United States Patent [19]

Thuren et al.

[11] 4,020,803

[45] May 3, 1977

[54] COMBINED FUEL INJECTION AND INTAKE VALVE FOR ELECTRONIC FUEL INJECTION ENGINE SYSTEMS

[75] Inventors: John B. Thuren, Norman, Okla.; Ambrose Tomala, Royal Oak, Mich.

[73] Assignee: The Bendix Corporation, Southfield, Mich.

[22] Filed: Oct. 30, 1975

[21] Appl. No.: 627,484

[52] U.S. Cl. .................. 123/32 VN; 123/75 B; 123/90.11
[51] Int. Cl.² .................. F02B 3/00; F02B 19/10
[58] Field of Search ....... 123/32 AE, 32 SP, 32 ST, 123/32 VN, 139 AW, 90.11, 75 B

[56] References Cited

UNITED STATES PATENTS

| | | | |
|---|---|---|---|
| 3,704,694 | 12/1972 | Gilewski | 123/32 VN |
| 3,882,833 | 5/1975 | Longstaff | 123/90.11 |

*Primary Examiner*—Ronald B. Cox
*Attorney, Agent, or Firm*—Anthony F. Cuoco

[57] ABSTRACT

A solenoid actuated combined fuel injection and intake valve supplies an air-fuel mixture to an electronic fuel injection system for an internal combustion engine. In one embodiment of the invention fuel injection is controlled dependent upon the operation of an auxiliary air-fuel intake valve while in another embodiment of the invention fuel injection is controlled independent of the operation of the auxiliary valve.

4 Claims, 2 Drawing Figures

COMBINED FUEL INJECTION AND INTAKE VALVE FOR ELECTRONIC FUEL INJECTION ENGINE SYSTEMS

BACKGROUND OF THE INVENTION

1. Field of the Invention

This invention relates generally to internal combustion engines and, particularly, to means for supplying an air-fuel mixture to internal combustion engines using electronic fuel injection. More particularly, this invention relates to combined fuel injection and air-fuel intake means for the purposes described.

2. Description of the Prior Art

Internal combustion engines using electronic fuel injection require means for introducing an appropriate air-fuel mixture to the engine combustion chambers. Electronic fuel injection systems generally include electronic control units which compute mass air flow by the "speed density" method utilizing engine rpm, manifold pressure and engine temperature signals, and compute the required fuel flow from a stored electrical schedule. A pulse is thus provided of appropriate duration for controlling electrically actuated fuel injectors or valves located just upstream of the individual cylinder intake ports. A system of this type is described in U.S. Pat. No. 2,980,090 issued on Apr. 18, 1961 to R. W. Sutton et al. and assigned to The Bendix Corporation, assignee of the present invention. Prior to the present invention there has not been a single combined valve for providing the required fuel injection and air-fuel intake functions.

SUMMARY OF THE INVENTION

This invention contemplates a solenoid operated combined fuel injection and air-fuel intake valve for use in an electronic fuel injection system for internal combustion engines. In one embodiment of the invention a fuel metering rod is displaced upon solenoid actuation of an auxiliary intake valve so that fuel injection and air-fuel intake are dependently controlled and in accordance with the position of the intake valve. In another embodiment of the invention the fuel metering rod is operated by one solenoid independent of the position of the intake valve, and which intake valve is operated by a separate solenoid so that the intake and fuel injection functions are independently controlled.

The device of the invention is particularly useful with a dual chamber stratified charge engine system wherein a rich air-fuel mixture is "spark" ignited in a pre-combustion chamber, and which ignited rich mixture then "torch" ignites a lean mixture in a main combustion chamber. An engine of this type has been developed by the Honda Motor Car Company and identified as their CVCC engine as described in the July, 1973 issue of *Science and Mechanics*, pages 40–43. It will be understood, however, that the device may be used as well with any internal combustion engine system using electronic fuel injection.

The main object of this invention is to provide a combined fuel injection and air-fuel intake valve for use in an internal combustion engine using an electronic fuel injection system.

Another object of this invention is to provide a valve of the type described for use on dual chamber stratified charge engines.

Another object of this invention is to provide a valve of the type described including solenoid actuated fuel injection means and air-fuel intake means.

Another object of this invention is to provide a valve of the type described which dependently controls the intake and fuel injection functions.

Another object of this invention is to provide a device of the type described which independently controls the intake and fuel injection functions.

Another object of this invention is to provide a device of the type described whereby a standard internal combustion engine can be more easily modified to the dual chamber stratified charge type engine.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 1:
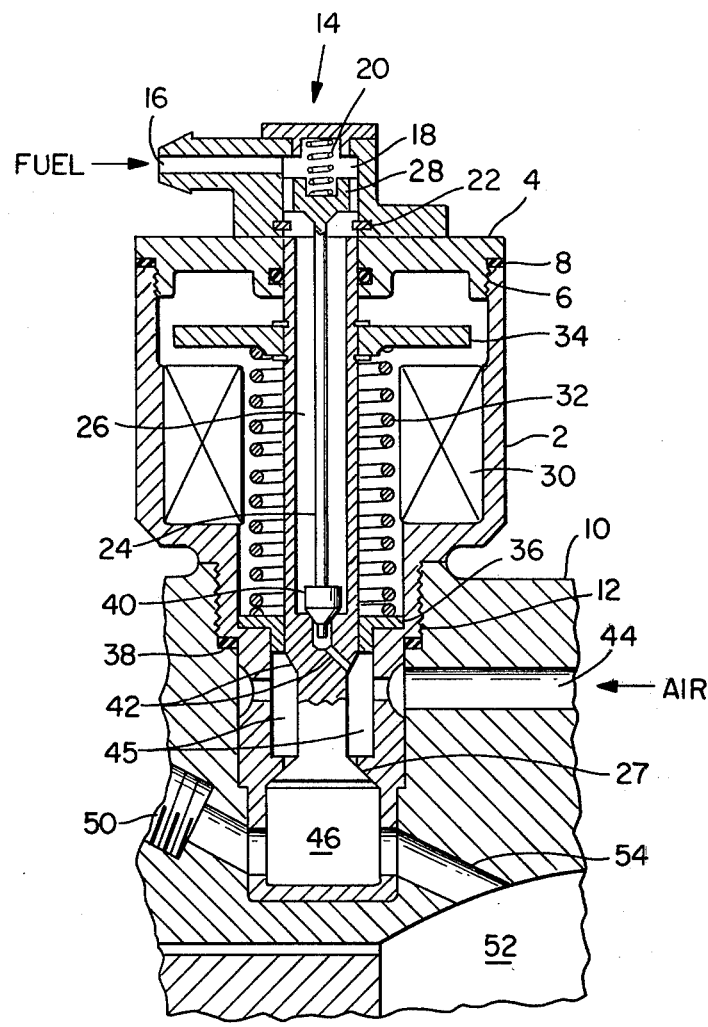
FIG. 1 is a partially sectioned plan view of an embodiment of the invention, wherein the fuel injection and intake functions are dependently controlled.

With reference first to FIG. 1, a valve housing 2 carries a cap 4 which may be in screw thread engagement with the housing at 6, with the housing and cap sealed by a washer or gasket 8. Housing 2 is in screw thread arrangement with an engine manifold 10 at 12.

Housing 2 includes a fuel inlet portion 14 having a fuel inlet conduit 16 communicating with a chamber 18 supporting a fuel metering rod seating spring 20 and a fuel metering rod travel stop 22. A fuel metering rod 24 is disposed in a longitudinally extending channel 26, and which rod terminates in an upper portion 28 which receives seating spring 20. Channel 26 is machined or otherwise provided in an auxiliary air-fuel intake valve 27 longitudinally disposed within housing 2 and manifold 10.

Housing 2 contains a valve actuating solenoid 30 which surrounds a valve return spring 32. Valve return spring 32 is supported intermediate a solenoid pull down plate 34 which is secured to the upper portion of auxiliary intake valve 27 and a valve guide bushing 36 supported within the housing. Housing 2 is sealed in manifold 10 through seal 38. Fuel metering rod 24 terminates at its bottom end in a member 40 which is effective for permitting and preventing fuel flow through ports 42 with the operation of solenoid 30 as will be further explained.

An air intake conduit 44 extends through manifold 10 and is in communication with a mixing chamber 45 which, in turn, is blocked from or opened to an auxiliary or pre-combustion chamber 46 through auxiliary intake valve 27. Intake valve 27 is operated by solenoid 30 as will also be further explained.

Auxiliary or pre-combustion chamber 46 is operatively arranged with a spark plug 50 for conventional "spark" ignition of a supplied air-fuel mixture as will be understood by those skilled in the art. Auxiliary chamber 46 is in communication with a main combustion chamber 52 through a "torch" port 54 whereby the spark ignited mixture in pre-chamber 46 torch ignites the mixture in main chamber 52. The description of the invention with relation to the interconnected pre-combustion and main combustion chamber 46 and 54, respectively, relates to a dual chamber stratified charge engine and is described for illustrative purposes only as heretofore noted, and is not to be considered as a limitation on the utility of the invention.

Figure 2:
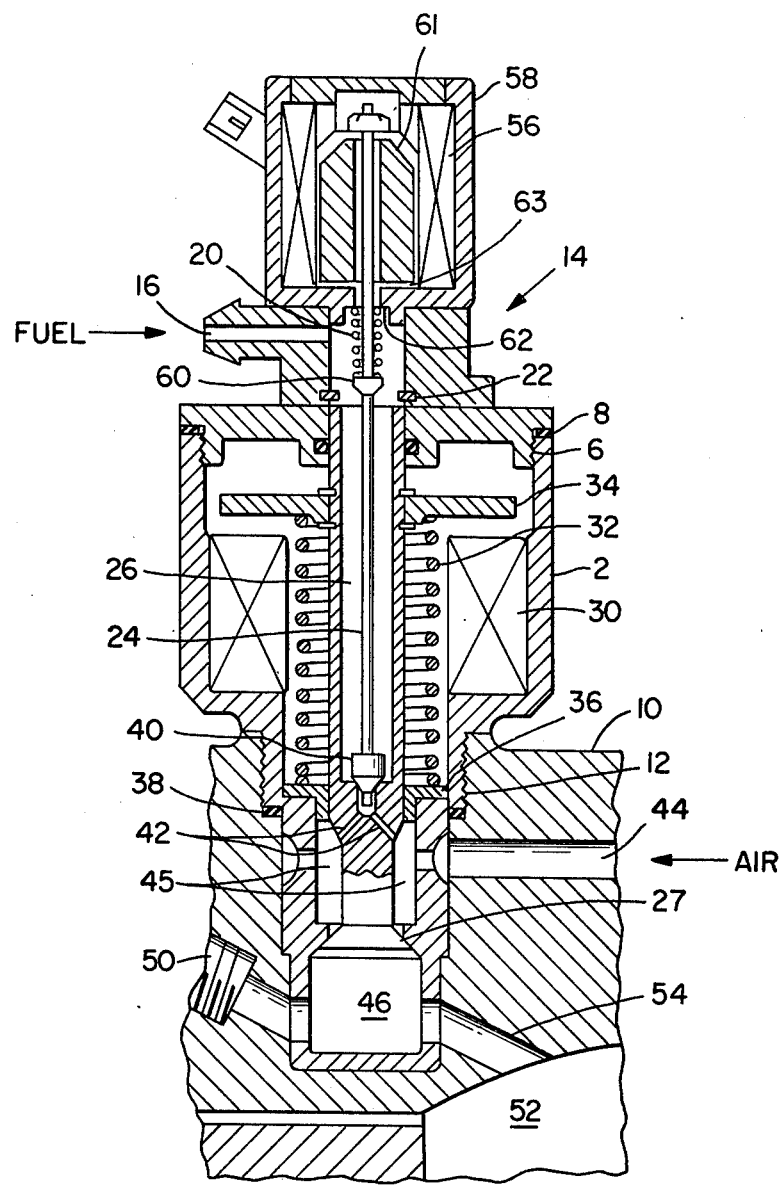
FIG. 2 is a partially sectioned plan view showing an embodiment of the invention wherein the fuel injection and intake functions are independently controlled.

The embodiment of the invention shown in FIG. 2 is in many respects similar to that shown in FIG. 1, except a separate solenoid 56 actuates fuel metering rod 24 as will be next described.

Housing extension 14 supports a case or housing 58 which contains solenoid 56. Metering rod seating spring 20 is disposed intermediate a flange 60 carried on the upper portion of metering rod 24 and the lower edge 62 of housing 58. Fuel metering rod 24 extends into case 58 as shown in the figure. Thus, while the embodiment of the invention shown in FIG. 1 features a single solenoid 30 which is effective for operating fuel metering rod 24 and intake valve 27 dependently, the embodiment of the invention shown in FIG. 2 features separate solenoids. In the structural arrangement described, solenoid 30 operates intake valve 27 while solenoid 56 operates fuel metering rod 24.

Fuel entering the valve of the invention through conduit 16 as shown in FIGS. 1 and 2 is supplied from a vehicle fuel tank via a suitable fuel pump (not shown) as is well known in the art. Air may be supplied through conduit 44 via operation of a throttle body (not shown) as is well known in the art. Further, signals for energizing solenoids 30 and 56 are provided by the electronic control unit (ECU) of the electronic fuel injection system such as described in substantial detail in the aforenoted U.S. Pat. No. 2,980,090.

OPERATION OF THE INVENTION

With reference to FIG. 1, pressurized fuel is introduced through fuel inlet conduit 16. The fuel supply is contained within channel 26 and is prevented from escaping therefrom by fuel metering rod 24 which is seated by the biasing action of spring 20 as shown in the figure.

In a typical operating cycle, valve actuating solenoid 30 is energized and causes solenoid pull down plate 34, which is mounted to auxiliary intake valve 27, to be downwardly displaced.

This downward displacement compresses valve return spring 32 and displaces auxiliary intake valve 27 from its seated position shown in the figure, causing the valve to travel downward. As auxiliary intake valve 27 travels downward, it carries fuel metering rod 24, part way in a seated position, due to the action of metering rod seating spring 20, until fuel metering rod 24 is adjacent metering rod travel stop 22, whereupon metering rod 24 is prevented from further following valve 27. The continued travel of auxiliary intake valve 27 carries the valve away from the now stationary fuel metering rod 24 to unseat the rod so that fuel is injected through ports 42 into chamber 45 behind the valve, and wherein the injected fuel and the air supplied through conduit 44 are mixed.

The fuel-air mixture passes into auxiliary chamber 46 from chamber 45 where appropriate "spark" ignition takes place. Upon de-energization of valve actuating solenoid 30, valve return spring 32 carries auxiliary intake valve 27 upward to its seated position thereby returning fuel metering rod 24 to its seated position as shown in the figure to prevent the air-fuel mixture from entering chamber 48, to prevent the injection of fuel through ports 42, and to end the cycle.

The primary difference between the embodiments of the invention shown in FIGS. 1 and 2 is the extension of the fuel metering rod 24 so that it can be operated independently by metering rod actuating solenoid 56 shown in FIG. 2. The rod extension is attached to solenoid plunger 61 and is displaced upward when the solenoid is energized to unseat the metering rod and permit fuel injection. In the de-energized position, a clearance 63 is provided between the plunger and the solenoid housing which allows metering rod seating spring 20 to exert a closing force on metering rod 24. This variation allows for independent operation of metering rod 24 and permits varied air-fuel ratios to be obtained in auxiliary chamber 46.

As will be understood by those skilled in the art, a lead-lag condition can be introduced between the fuel metering rod and auxiliary intake valve openings and closings as may be required or desired by time related energization and deenergization of solenoids 30 and 36. In the event that metering rod actuating solenoid 56 in FIG. 2 is inoperative for any reason, the operation of the invention as shown in FIG. 2 will be the same as that as shown in FIG. 1.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Combined fuel injection and air intake apparatus for an internal combustion engine, comprising:
    a substantially hollow longitudinal extending housing mounted to the engine manifold;
    longitudinally extending valve means supported within the housing and manifold;
    an air-fuel mixing chamber within the manifold;
    the valve means including a longitudinally extending channel;
    fuel flow metering means supported within the channel in operative relation with the valve means;
    a fuel inlet conduit in communication with the channel;
    an air inlet conduit in communication with the mixing chamber;
    solenoid means supported within the housing in cooperative relation with the valve means and fuel flow metering means, said valve means being seated to prevent communication between the mixing chamber and a combustion chamber within the manifold, and the fuel metering means being seated to prevent communication between the channel and the mixing chamber, when the solenoid means is de-energized;
    energization of the solenoid means displacing the valve means and the fuel metering means to unseat both of said means, whereupon fuel is injected into the mixing chamber to provide an air-fuel mixture which is supplied to the combustion chamber; and
    means arranged with the fuel metering means so that upon energization of the solenoid means the fuel metering means is displaced a predetermined distance with the valve means until the fuel metering means is stationary, and the valve means is displaced away from the stationary fuel metering means whereupon both of said means are unseated.

2. Apparatus as described in claim 1, wherein the means arranged with the fuel metering means so that upon energization of the solenoid means the fuel metering means is displaced a predetermined distance with the valve means until the fuel metering means is stationary includes:

biasing means for biasing the fuel metering means in the direction of the displacement so that the metering means is displaced with the valve means; and stop means for preventing displacement of the fuel metering means with the valve means beyond the predetermined distance.

3. Apparatus as described by claim 2, including:

biasing means arranged with the valve means for returning the valve means to the seated position upon de-energization of the solenoid means, with the fuel metering means being displaced with the valve means away from the stop means and to its seated position.

4. Combined fuel injection and air intake apparatus for an internal combustion engine, comprising:

a substantially hollow longitudinal extending housing mounted to the engine manifold;

longitudinally extending valve means supported within the housing and manifold;

an air-fuel mixing chamber within the manifold;

the valve means including a longitudinally extending channel;

fuel flow metering means supported within the channel in operative relation with the valve means;

a fuel inlet conduit in communication with the channel;

an air inlet conduit in communication with the mixing chamber;

solenoid means supported within the housing in cooperative relation with the valve means and fuel flow metering means, said valve means being seated to prevent communication between the mixing chamber and a combustion chamber within the manifold, and the fuel metering means being seated to prevent communication between the channel and the mixing chamber, when the solenoid means is de-energized;

energization of the solenoid means displacing the valve means and the fuel metering means to unseat both of said means, whereupon fuel is injected into the mixing chamber to provide an air-fuel mixture which is supplied to the combustion chamber; and the solenoid means including a first solenoid supported within the housing in cooperative relation with the valve means, a second solenoid supported within the housing in cooperative relation with the fuel metering means, energization of the first solenoid displacing the valve means in one direction to unseat said means, energization of the second solenoid displacing the fuel metering means in the opposite direction to unseat said means, and the displacement of the fuel metering means being independent of the displacement of the valve means.

* * * * *